July 14, 1964

E. G. SUNDBERG 3,140,962

TUBULAR BATTERY

Filed Sept. 26, 1960

INVENTOR
Erik G. Sundberg

BY

ATTORNEYS

July 14, 1964     E. G. SUNDBERG     3,140,962

TUBULAR BATTERY

Filed Sept. 26, 1960     3 Sheets-Sheet 2

INVENTOR
Erik G. Sundberg

BY *Strauch, Nolan & Neale*

ATTORNEYS

July 14, 1964     E. G. SUNDBERG     3,140,962
TUBULAR BATTERY

Filed Sept. 26, 1960     3 Sheets-Sheet 3

INVENTOR
Erik G. Sundberg

BY *Strauch, Nolan & Neale*
ATTORNEYS

United States Patent Office 3,140,962
Patented July 14, 1964

3,140,962
TUBULAR BATTERY
Erik G. Sundberg, Nol, Sweden, assignor to Aktiebolaget
Tudor, a corporation of Sweden
Filed Sept. 26, 1960, Ser. No. 58,275
6 Claims. (Cl. 136—6)

This invention relates to storage batteries and particularly to battery cells that are adapted for use in various applications wherein a battery having external cylindrical walls may be advantageously used.

While dry cell batteries have commonly been constructed to have a central electrode surrounded by an outer cylindrical electrode, a cylindrical construction for liquid electrolyte type storage batteries having positive and negative electrodes lying in parallel planes has never been attempted, so far as it is known, on a commercial basis. A cylindrical battery offers several advantages over the usual box or rectangularly shaped liquid type electrolyte storage battery in that less material is required for the outer walls of a cylindrical battery having a given volume and also the cylindrical outer walls are stronger than the rectangular walls. More important, however, is the fact that in some practical applications, only batteries having cylindrical walls may be accommodated.

One use of the new battery in accordance with the present invention is in light buoys which are conventionally equipped for gas illumination. Such buoys are constructed with one or several cylindrical tubular housings normally used for a cylindrical container for an illumination gas such as acetylene. The buoy housings are provided with a removable water tight cover, and periodically the gas containers may be replaced with refilled containers.

For technical and economical reasons, it is desired to provide light buoys with an electrically operated light source; however, to use the many thousands of buoys now in existence, it is necessary that the cylindrical housings which normally carry the acetylene gas containers must be used to carry the electric storage battery.

One of the problems in providing storage batteries of this type is that ordinarily the electrodes and separators are made in the form of flat plates and of uniform area throughout the battery, which means substantially equal lengths and equal breadths. However, such electrode and separator constructions would obviously not utilize a cylindrical battery container to full capacity.

The depth of cylindrical tubular housings in light buoys is considerably greater than the height of a conventional battery cell container and accordingly it has been proposed for better utilization of the available space in light buoys to place one or several batteries on top of each other. However, it has been found necessary to arrange the batteries a certain distance from each other in order to make room for the respective lower batteries to bring their electrical connections upwardly through the cylindrical container and also to provide a path for the escape of gases which are liberated in the battery cells during operation. With such arrangement of battery units on top of each other, inspection of the several batteries is very difficult since only the uppermost battery in each light buoy container is readily accessible. For inspection or checking of the specific gravity and level of electrolyte of the lower cells, it is necessary that all of the upper cells be first removed. In addition to the foregoing difficulties there is an additional factor that light buoys are subjected to violent movements and the batteries must be securely clamped into position in the buoy to provide satisfactory long life operation of the battery.

It is the principal object of the present invention to provide a novel battery which obviates the several problems discussed above by providing a battery of such shape as to substantially improve the space utilization of the cylindrical tubular housing in the light buoy while utilizing electrodes and separators of conventional planar shape with substantially identical length and breadth dimensions.

Another object of the invention is to provide a novel battery construction composed of three cells having radially extending walls which intersect at the center of the cylindrical housing and are oriented at the angles of approximately 120° with each other to thereby provide individual cells which support themselves against each other and against the cylindrical wall of the light buoy housing in such manner as to result in a secure, shake-proof installation without extra clamping mechanisms.

A further object of the invention is to provide a novel cylindrical battery which is slidably received in a cylindrical tubular wall of a light buoy container and which has electrodes that have lengths corresponding to the depth of the battery container in the buoy.

These and other objects of the invention will become more fully apparent from the claims, and from the description as it proceeds in connection with the drawings wherein:

Figure 1:
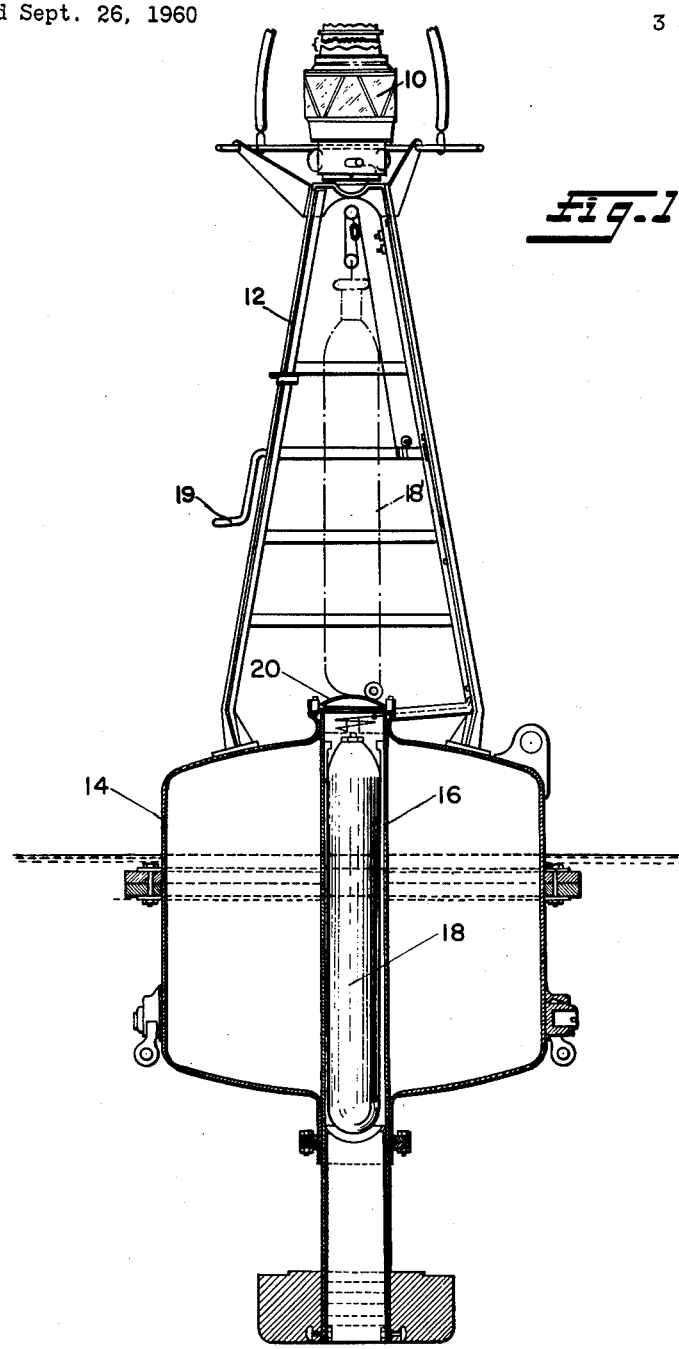
FIGURE 1 is a diagrammatic view of a light buoy partially in section showing the battery of the present invention mounted in the central portion of the buoy where cetylene gas tanks previously had been mounted for operation of the light.

To illustrate one important use of a battery in accordance with the present invention, a light buoy is shown in FIGURE 1 which conventionally contains a lamp 10 near its top, a tower 12 and a central water-tight compartment 14 into which one or more central storage compartments having cylindrical walls 16 are provided for normally receiving acetylene gas tanks. Such tanks conventionally have a length which is greater than five times the diameter of the container and hence one of the important features of the present invention is that a single battery 18 is provided which extends from near the bottom to the top of wall 16 in the central buoy compartment 14. Over battery 18 is a water-tight cover 20 which may be opened to permit the battery 18 to be raised to its dotted line position 18' so that it can be easily moved into and out of the buoy by hand crank 19.

Figure 2:
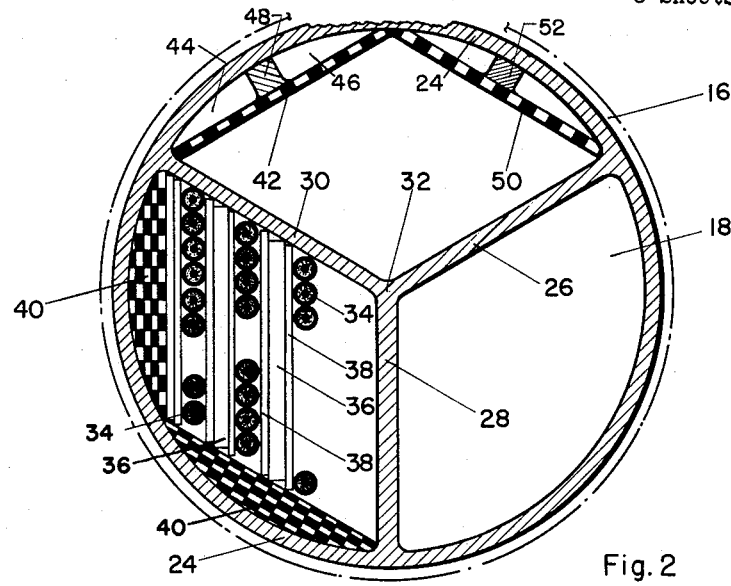
FIGURE 2 is a cross-sectional view of a battery in accordance with the present invention showing in the left hand third a schematic arrangement of conventional planar electrodes and separators having identical sizes and shapes.

Referring now to FIGURE 2, the only portion of the buoy shown is cylindrical wall 16 of the container into which storage battery 18 fits. The storage battery in accordance with this form of the invention consists of three cells mounted in a battery container having cylindrical walls 24. The three cells have dividing walls 26, 28 and 30 which extend radially from the center 32 of battery 18 toward the outer peripheral wall 24. The angle between adjacent walls 26, 28 and 30 is substantially 120°.

In this embodiment, the positive electrodes 34 are illustrated as being of the pencil type having a plurality of vertical rods mounted side by side in a frame to form a planar electrode. The negative electrodes 36 may be separated from positive electrodes 34 by separator plates 38 which are used in conventional battery constructions. Each cell may be composed of a plurality of electrode plates, the number of which is determined by the outer diameter of the battery and by factors which determine the optimum thickness for the positive and negative electrodes and for the separator plates 38. Such storage batteries are well known and may be of the general type shown in U.S. Patent Nos. 2,117,371, issued May 17, 1938, or 1,546,379 issued July 21, 1925.

Figure 6:
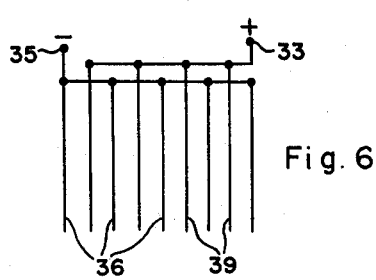
FIGURE 6 is a diagrammatic illustration showing conventional intra-cell electrode connections which may be incorporated in the batteries of FIGURES 1 to 5.
Figures 7, 8:
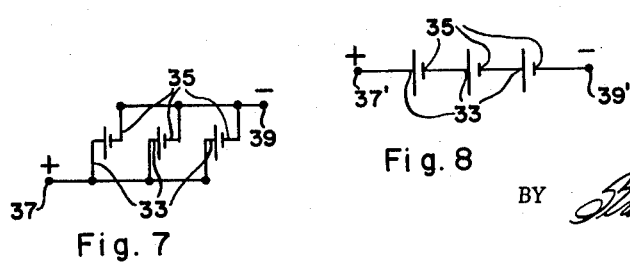
FIGURE 7 is a diagrammatic illustration of a conventional parallel-cell battery circuit which may be incorporated in batteries of the present invention.
FIGURE 8 is a diagrammatic illustration showing a conventional series-cell battery circuit which may be incorporated in the above batteries.

As shown in FIGURE 6, all the positive electrodes 34 of any one cell may be joined in parallel to a positive intra-cell connector 33, and all the negative electrodes 36 may be connected in parallel to a negative intra-cell connector 35 as is conventional. Further, as alternatively shown in FIGURES 7 and 8, the cells of the batteries of the invention may be connected in either parallel or series relationship as is also conventional. Thus, in FIGURE 7 the positive connector 33 of each cell of the battery is connected in parallel to a positive battery terminal 37, and each negative cell connector 35 is similarly connected in parallel to a negative battery terminal 39. In FIGURE 8 the negative intra-cell connector 35 of one cell of the battery is connected to the negative battery terminal 39′ and the positive intra-cell connector 33 of that cell is connected to the negative intra-cell connector 35 of an adjacent cell, and so on through the battery with the positive intra-cell connector of the last cell directly connected to a positive battery terminal 37′, all as conventional in the battery art.

Each of the electrodes 34 and 36 and separator plates 38 may extend substantially the full length of the battery so that when checking or servicing the battery, only the top cover of the battery need to be opened to gain access to the interior of the battery to observe the level of and test the specific gravity of the liquid electrolyte.

By orienting the electrodes so that they are disposed in a plane parallel to one of walls 28 or 30, electrodes having the same breadth may be used throughout the cell. The edge portions of the cell between the end of the electrodes and outer wall 24 provided with a porous filling material 40, such as plastic which besides serving as a support for the electrodes, presents additional electrolyte reservoir capacity due to its porosity.

Instead of using porous material which fills the entire space, it is also possible to use a sheet 42 of a porous filling material, as shown in the upper cell of the battery of FIGURE 2, to hold the electrodes in place and to provide additional electrolyte rservoirs 44 and 46 on opposite sides of a rigid support member 48 which serves to hold the layer 42 in position. The negative and positive electrodes and the separator are not shown in the cell of the upper third of the battery shown in FIGURE 2 since they would be disposed in parallel planes as shown in the left hand cell with the planes lying parallel to layer 42 and interior wall 26. A similar layer 50 and support member 52 may be provided also in the upper cell as shown in FIGURE 2 to serve as an end support for the electrode members and separator sheets.

The cell on the right side of battery 18 of FIGURE 2 may be constructed in a manner similar to that disclosed in connection with either the left hand section or the top section. In any one battery, it is preferred to use a uniform construction for each of the three cells.

Figure 3:
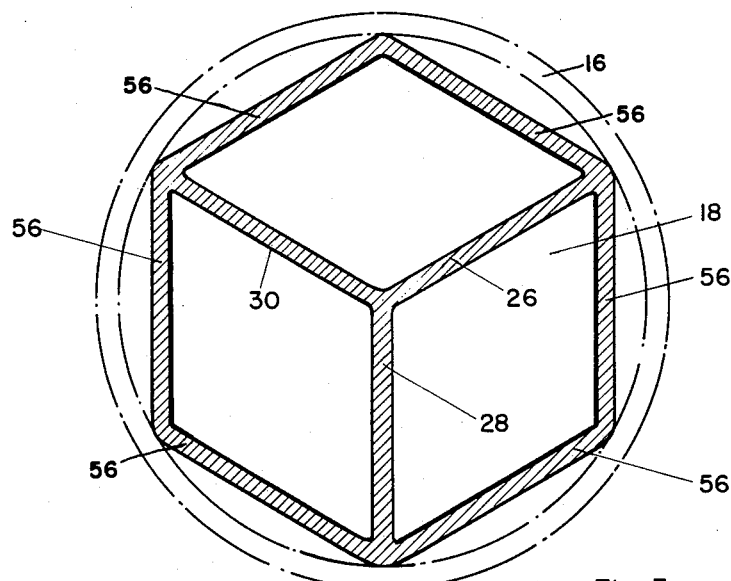
FIGURE 3 is a cross-sectional view of a modified storage battery cell wall construction wherein each cell has identical rhombic cross-sections.

Referring now to FIGURE 3, battery 18 is again divided into three cells by internal dividing walls 26, 28 and 30 which are each radially disposed from the center of the battery at angles of approximately 120°. However, the exterior walls of the battery are hexagonal in shape rather than circular as shown in the embodiment described in connection with FIGURE 2. Each cell thus has a cross-section in the form of a rhombus. The positive electrodes 34, negative electrodes 36 and spacers 38 are placed in each of the three cells in parallel planes, which planes are parallel to one of the dividing walls of each cell as illustrated in the left hand cell of FIGURE 2. In the embodiment of FIGURE 3, the outer walls 56 provide the entire support for the electrode and separator elements and there is no need for either the porous filling material 40 or porous layer 42 as shown and described in connection with the battery illustrated in FIGURE 2.

Figure 4:
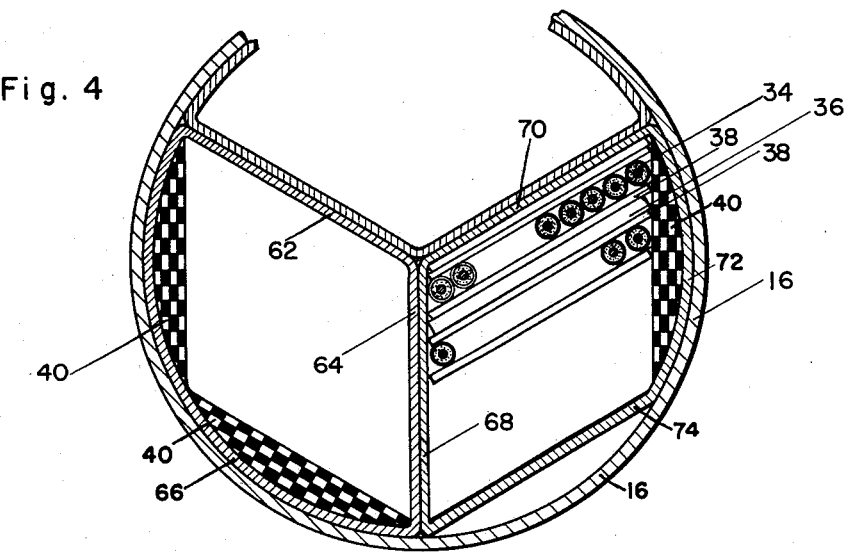
FIGURE 4 is a cross-sectional view of a further embodiment wherein each of the three cells making up the storage battery have separate walls to thereby be independently removable from the battery.

In the embodiment shown in FIGURE 4, each of the three cells which make up the storage battery have independent walls and thus are independently slidable into and out of the cylindrical wall 16 of the container in the buoy. The left hand cell may have two radially extending walls 62 and 64 and an outer circumferential wall 66 which is of cylindrical shape and joins the ends of radial walls 62 and 64. Only the porous filling material 40 is illustrated in this embodiment as the positive and negative electrode structures and separators may be identical with the corresponding parts shown in FIGURE 2.

The right hand cell of the storage battery shown in FIGURE 4 is slightly modified from the left hand cell to show a modified cell construction which may have radially extending walls 68 and 70 and peripheral walls 72 and 74. Peripheral wall 74 may be parallel to radial wall 70 whereas peripheral wall 72 is arcuate shaped. Porous filling material 40 described above in connection with FIGURE 2 may be used to hold the electrodes and separators in position.

The third or top cell of the battery shown in FIGURE 4 may be identical to either the left hand or the right hand cell already described.

Figure 5:
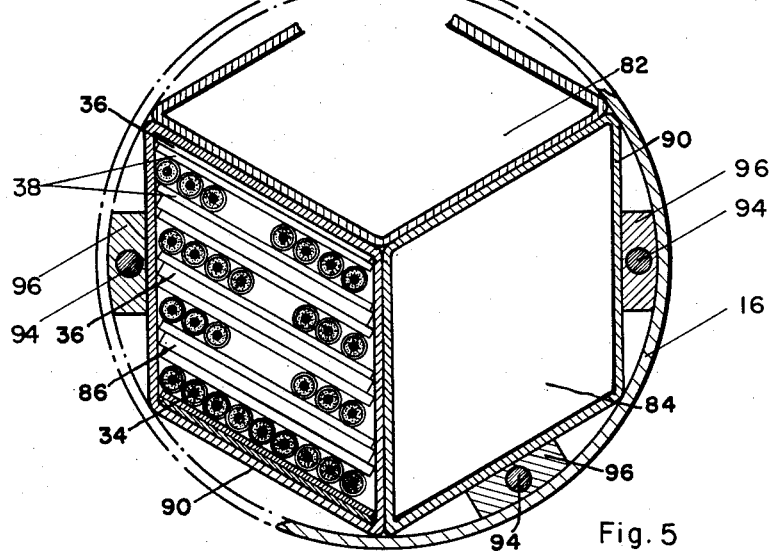
FIGURE 5 shows yet a further embodiment wherein the rhombic shaped cells forming the storage battery are given added wall support by use of supporting elements.

In the embodiment shown in FIGURE 5, each of the cells 82, 84 and 86 is composed of identical groups of positive electrodes 34, negative electrodes 36 and separators 38 as in the above described embodiments. The outer walls of each cell are independent and slidable relative to one another as described in connection with FIGURE 4 above. The radially extending walls lie at angles of approximately 120° relative to each other and opposite side walls of each cell are parallel thereby forming rhombic cross-sections and a hexagonal peripheral configuration. To further secure the storage battery within the cylindrical walls 16 of the housing of the buoy against rotation or other movements which may occur because of the violent motions to which buoys are subjected, metal supporting rods 94 surrounded by blocks 96 of a supporting material such as wood, rubber, plastic or the like, may be used.

While the invention has been described in connection with light buoys it should be understood that cylindrical batteries may be useful in any other application where storage batteries are commonly used and may find peculiar advantage in specialized installations such for example as torpedos and air projectiles which have generally cylindrical shapes. Starter batteries for internal combustion engines may be also advantageously constructed to have certain of the features as described above.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An elongated storage battery adapted to fit into a deep cylindrical container space comprising wall means defining at least three cells extending substantially the length of said battery; said wall means including cell-separating portions extending radially outwardly from a central battery axis and disposed at angles of substantially 120° to each other; and a plurality of substantially planar, elongated, parallel electrodes in alternating positive-negative series extending longitudinally within each cell; said electrodes being dimensionally equal to each other in length and width and being disposed in parallel relation to one of said cell-separating wall portions with the longitudinal edges of the electrodes of each cell defining planes parallel to an adjacent cell-separating wall portion.

2. The storage battery as defined in claim 1 wherein said plurality of electrodes includes parallel rows of rod shaped positive electrodes separated by parallel plate-like negative electrodes together with a liquid electrolyte in each cell.

3. An elongated storage battery for a light buoy having a deep cylindrical tubular battery receiving housing composed of three cells defined by dividing walls between said cells extending from the center of said battery radially toward the periphery thereof at angles of substantially 120° relative to each other, each cell having a plurality of elongated positive and negative electrodes lying in parallel planes, all of the electrodes of each cell having substantially the same breadth and area with the longest dimension in the direction of the axis of and substantially coextensive with the length of said battery, said plurality of parallel electrodes in each cell being oriented to define an overall rhombic cross section the sides thereof being parallel to two of said dividing walls.

4. The storage battery as defined in claim 3 wherein each cell includes a substantially arcuate outer wall joining the ends of two adjacent dividing walls.

5. The storage battery as defined in claim 4 together with porous filling material adapted to contain electrolyte positioned between said plurality of electrodes and said arcuate outer wall of each cell.

6. The storage battery as defined in claim 3 wherein each cell includes an outer peripheral wall joining the ends of adjacent dividing walls and including two wall sections each parallel to one of said dividing walls to thereby provide a hexagonal cross section for said battery.

References Cited in the file of this patent
UNITED STATES PATENTS

| | | |
|---|---|---|
| 658,235 | Cheval et al. | Sept. 18, 1900 |
| 1,449,746 | Exley et al. | Mar. 27, 1923 |
| 2,534,056 | Pitt | Dec. 12, 1959 |
| 2,918,515 | Lawson | Dec. 22, 1959 |
| 2,945,079 | Johnson et al. | July 12, 1960 |